United States Patent
Österling et al.

(10) Patent No.: US 7,571,338 B2
(45) Date of Patent: Aug. 4, 2009

(54) DETERMINING A TIME DIFFERENCE BETWEEN FIRST AND SECOND CLOCK DOMAINS

(75) Inventors: Jacob Österling, Järfälla (SE); Torbjörn Aarflot, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 793 days.

(21) Appl. No.: 11/131,347

(22) Filed: May 18, 2005

(65) Prior Publication Data

US 2005/0286507 A1    Dec. 29, 2005

Related U.S. Application Data

(60) Provisional application No. 60/573,338, filed on May 24, 2004.

(51) Int. Cl.
    *G06F 1/04*     (2006.01)
    *G06F 1/14*     (2006.01)
    *G06F 11/00*    (2006.01)

(52) U.S. Cl. ............... 713/500; 713/502; 713/503; 375/354; 375/362; 375/371; 375/372

(58) Field of Classification Search ............... 713/500, 713/502, 503; 375/354, 362, 371, 372
See application file for complete search history.

(56) References Cited

U.S. PATENT DOCUMENTS

| | | | |
|---|---|---|---|
| 6,359,479 B1 * | 3/2002 | Oprescu | 327/141 |
| 6,370,600 B1 | 4/2002 | Hughes et al. | |
| 6,687,255 B1 * | 2/2004 | Holm et al. | 370/412 |
| 7,092,733 B2 * | 8/2006 | Mukai et al. | 455/552.1 |
| 2003/0028701 A1 * | 2/2003 | Rao et al. | 710/305 |
| 2003/0043943 A1 * | 3/2003 | Chang et al. | 375/354 |
| 2004/0117499 A1 * | 6/2004 | Liu et al. | 709/231 |

FOREIGN PATENT DOCUMENTS

| | | |
|---|---|---|
| EP | 1276028 | 1/2003 |
| WO | 00/76116 | 12/2000 |

OTHER PUBLICATIONS

CPRI Specification V1.0; "Common Public Radio Interface (CPRI); Interface Specification;" Sep. 30, 2003; pp. 1-54.
International Search Report mailed Sep. 8, 2005 in corresponding PCT Application PCT/SE2005/000767.

* cited by examiner

*Primary Examiner*—Thomas Lee
*Assistant Examiner*—Michael J Brown
(74) *Attorney, Agent, or Firm*—Nixon & Vanderhye P.C.

(57) ABSTRACT

Buffer circuitry receives data to be processed by electronic circuitry using a first clock signal associated with a first clock domain. The buffered data is output using a second clock signal associated with a second clock domain. The buffering of the data is associated with a buffering delay. Counting circuitry receives at a start count input a write timing signal associated with the first clock domain and with writing data to the buffer circuitry. The counting circuitry receives at a stop count input a read timing signal associated with the second clock domain and with reading data from the buffer circuitry. A count value accumulated between receiving the write timing signal and the read timing signal corresponds to the buffering delay. Control circuitry performs a control operation based on the count value.

32 Claims, 7 Drawing Sheets

DETERMINING A TIME DIFFERENCE BETWEEN FIRST AND SECOND CLOCK DOMAINS

RELATED APPLICATION

This application claims priority from U.S. provisional application No. 60/573,338, filed on May 24, 2004, entitled "CPRI SERDES Timing," the contents of which is incorporated herein by reference. In addition, the application is related to co-pending PCT application PCT/IB2004/003170, entitled "Interface, Apparatus, And Method For Communication Between A Radio Equipment Control Node And A Remote Radio Equipment Node In A Radio Base Station," filed on Sep. 29, 2004, the contents of which is incorporated herein by reference.

TECHNICAL FIELD

The technical field relates to determining a time difference between different clock domains. One example situation is communications between first and second processing circuits either on the same integrated circuit or on different integrated circuits. One of the two processing circuits could be a serializer/deserializer (SERDES) and the other an application specific integrated circuit (ASIC). Such may arise in many contexts including a distributed radio base station where a base station includes a main baseband processing unit coupled to one or more remote radio units where RF processing occurs.

BACKGROUND AND SUMMARY

In a typical cellular radio system, wireless user equipment units (UEs) communicate via a radio access network (RAN) with one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a radio base station. A cell is a geographical area where radio coverage is provided by the radio equipment at a base station site. Each cell is identified by a unique identity, which is broadcast in the cell. The radio base stations communicate over the air interface with the user equipment units (UE) within range of the base stations. In the radio access network, several base stations are typically connected (e.g., by landline or microwave link) to a control node known as a base station controller (BSC) or a radio network controller (RNC). The control node supervises and coordinates various activities of connected plural radio base stations. The control node is typically connected to one or more core networks.

A conventional radio base station in a cellular communications system is generally located in a single location, and the distance between the baseband circuitry and the radio circuitry is relatively short, e.g., on the order of one meter. A distributed radio base station includes the radio equipment control (REC) and the radio equipment (RE). Both parts may be physically separated, (i.e., the RE may be close to the antenna, whereas the REC is located in a conveniently accessible site), or both may be co-located as in a conventional radio base station design. The radio equipment control (REC) performs baseband signal processing, and each radio equipment (RE) converts between baseband and radio frequencies and transmits and receives signals over one or more antennas. Each RE serves a certain geographic area, sector, or cell. Separate, dedicated optical and/or electrical links connect the radio equipment control (REC) to each of the plural remote radio equipment (RE). However, the term link as used here refers to a logical link and is not limited to any particular physical medium. Each link carries digital information downlink from the REC to the RE and digital information uplink from the RE to the REC.

Efforts have been underway to provide a standardized common interface between a REC and one or more REs to enable flexible and efficient product differentiation for radio base stations and independent technology evolution for the RE and REC. One such standard is the Common Public Radio Interface (CPRI), and it defines necessary items for transport, connectivity, and control including user plane data, control and management (C&M) plane transport mechanisms, and synchronization. The CPRI interfaces carries timing information, IQ data samples, and operations and maintenance (O&M) link for communications between the REC and each RE. These three flows are multiplexed in a time division multiplex (TDM) frame structure transferred on the interface based on 8B/10B coding (8 bits of data encoded to 10 bits words). Timing information is communicated to the REs by aligning a hyperframe start in the downlink direction (REC→RE) to a frame start (FS) in the REC. Each RE extracts the hyperframe start and uses it as a recovered frame start. The recovered frame start should be compensated to correct for various delay components associated with the downlink interface. The hyperframe control information includes a known symbol (e.g., in the CPRI the known symbol is a K28.5 symbol) for use in obtaining synchronization between the REC and each RE. The synchronization includes detecting the known symbol to retrieve one or more hyperframe borders.

An important requirement for this kind of distributed base station is accurately measuring and compensating for a transmission time delay associated with the distributed transmission link/internal interface. Typically, a round-trip delay is determined for transmitting a signal from the REC to an RE and returning that signal to the REC. Another key requirement is to transmit data over the radio/air interface with very high timing accuracy. In a distributed base station, this means that two REs coupled to an REC should be very accurately synchronized. In one example scenario, a maximum timing difference between two REs might be on the order of tens of nanoseconds. That maximum timing difference is largely "budgeted" for analog parts, temperature changes, and installation (mis-)calibration. This leaves a timing difference budget for the digital parts only on the order of a few nanoseconds.

When transmitting data over the radio air interface with very high timing accuracy, the REC has a first time maintained by an REC local "air frame" timer or counter when the REC believes that the frame is transmitted over the radio air interface. Similarly, the RE has a second different time maintained by an RE local timer or counter that the RE derives from the frame received from the REC by extracting the K28.5 symbol, hyperframe number, and frame number, as defined in the CPRI specification In other words, the REC digital circuitry and the digital circuitry in each RE operate using different clock domains maintained by respective local timers or counters, i.e., two different clock sources operating at the same frequency but with variable phase. A clock domain is defined as that part of a design which is driven by either a single clock or clocks that have constant phase relationships. Conversely, domains that have clocks with variable phase and time relationships are considered different clock domains. To have the REC and RE local timers being precisely in phase the CPRI interface delay from the REC to the RE must be known. Part of that delay depends on a delay associated with different timing domains in each of the REC and/or RE.

An REC and/or RE itself may also operate using plural clock domains. For example, an REC may couple baseband processing circuitry, including a framer/deframer that uses a first internal clock, to a SERDES that uses a second internal clock. The RE may include a CPRI interface application specific integrated circuit (ASIC) that uses a first internal clock and a radio air interface processing ASIC that uses a second different internal clock. When transferring data from one clock domain to another, a buffer is introduced to synchronize the data. Data from the first clock domain is written to the buffer using a first clock domain timing signal. That data is read from the buffer using a second clock domain timing signal. The time that the data is in the buffer depends on the phase relationship between the two clock domains and is therefore unknown. Because the buffer delay is part of the overall delay between the REC and the RE, it should be measured so that it can be compensated.

Recognizing these problems and challenges, the inventors designed a solution not only for distributed base stations, but also for any situation where a delay is caused by changing between different clock domains using a buffer or the like. Buffer circuitry receives data to be processed by electronic circuitry using a first clock signal associated with a first clock domain. The buffered data is output using a second clock signal associated with a second clock domain. The buffering of the data is associated with a buffering delay. Counting circuitry receives at a start count input a write timing signal associated with the first clock domain and with writing data to the buffer circuitry. The counting circuitry receives at a stop count input a read timing signal associated with the second clock domain and with reading data from the buffer circuitry. The timing signal can be any type of timing signal. Several non-limiting examples include a clock signal, a trigger signal, a strobe signal, etc. A count value accumulated between receiving the write timing signal and the read timing signal corresponds to the buffering delay. Control circuitry performs a control operation based on the count value. For example, the accumulated count value represents a phase difference between the first and second clock signals, and the control circuitry may compensate for the phase difference.

In one non-limiting detailed example embodiment, the first clock domain is associated with first processing circuitry, and the first clock signal is a transmit write clock associated with writing data into transmit buffer circuitry. The second clock domain is associated with second processing circuitry, and the second clock signal is a transmit read clock signal associated with reading data from the transmit buffer circuitry. The first and second processing circuitry can be associated with the same integrated circuit or separate integrated circuits. The counting circuitry includes a transmit counter. The second processing circuitry includes a parallel-to-serial converter for receiving data output in parallel format from the transmit buffer circuitry using the transmit read clock signal, converting the parallel data into serial format in accordance with a transmit serial clock signal, and providing serial data to a transmit serial interface. The transmit write clock signal and the transmit read clock signal have approximately the same frequency, which is lower than a frequency of the transmit serial clock signal. The transmit counter may be clocked in accordance with the transmit serial clock signal.

In the opposite receive direction, the first clock domain is associated with first processing circuitry, the first clock signal is a receive write clock associated with writing data into receive buffer circuitry, the second clock domain is associated with second processing circuitry, and the second clock signal is a receive read clock signal associated with reading data from the receive buffer circuitry. The counting circuitry includes a receive counter and the first processing circuitry includes a serial-to-parallel converter for outputting in parallel format the receive read clock signal, converting serial data from a serial interface into parallel format in accordance with a receive serial clock signal, and writing parallel data to the receive buffer circuitry in accordance with the receive write clock signal. The receive write clock signal and the receive read clock signal have approximately the same frequency, which is lower than the frequency of the receive serial clock signal. The receive counter is clocked in accordance with the receive serial clock signal.

In one preferred example implementation, the write timing signal relates to writing a known synchronization symbol to the buffer circuitry, and the read timing signal relates to reading the known synchronization symbol from the buffer circuitry. An example synchronization symbol is a K28.5 symbol.

In another example embodiment, the counter circuitry may also include a clock counter configured to receive at a start count input one of the timing signals and to receive at a stop count input a reference timing signal associated with a third clock domain different from the first and second clock domains. The control circuitry performs additional control operations based on the accumulated clock count value.

A particularly advantageous (but still example) application is in the context of a distributed base station that includes a first radio base station node that operates in conjunction with a remote second radio base station node. A base station clock source produces a first reference clock signal. A framer/deframer formats information into frames and transfer frames to/receives frames from a serializer/de-serializer (SERDES) using a second reference clock signal. The SERDES receives the first reference clock signal and generates word clock signals and serial clock signals for transmit and receive paths. The second reference clock and the word clocks have substantially the same frequency but are out of phase. The serial clocks have substantially higher frequency than the second reference clock and the word clocks.

The SERDES includes a transmit buffer for storing a data word from the framer in accordance with the second reference clock signal and for outputting the stored data word in accordance with the transmit word clock signal. The buffering of the data word in the transmit buffer is associated with a transmit buffering delay. A receive buffer stores a received data word in accordance with the receive word clock signal and outputs the stored data word in accordance with the second reference clock signal to the de-framer. The buffering of the data word in the receive buffer is associated with a receive buffering delay.

A transmit counter receives at a start count input a transmit write timing signal associated with the second reference clock signal when the data is written into the transmit buffer. It also receives at a stop count input a receive read timing signal associated with the transmit word clock signal when the data word is read from the transmit buffer. A transmit buffer count value accumulated between receiving the transmit write timing signal and the transmit read timing signal corresponds to the transmit buffer delay. Similarly, a receive counter receives at a start count input a receive write timing signal associated with the receive word clock signal when the data word is written into the receive buffer and receives at a stop count input a receive read timing signal associated with the second reference clock signal when the data word is read from the receive buffer. A receive buffer count value accumulated between receiving the receive write timing signal and the receive read timing signal corresponds to the receive buffer delay. Control circuitry performs a control operation based on one or both of the transmit buffer count value and the receive buffer count value.

These and other features and advantages are further described in connection with the figures and the detailed description.

DETAILED DESCRIPTION

The following description sets forth specific details, such as particular embodiments, procedures, techniques, etc., for purposes of explanation and not limitation. But it will be appreciated by one skilled in the art that other embodiments may be employed apart from these specific details. For example, although the following description is facilitated using non-limiting examples, the technology described here may be employed in any type of radio communications system where base stations are used. In some instances, detailed descriptions of well-known methods, interfaces, circuits, and signaling are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 1:
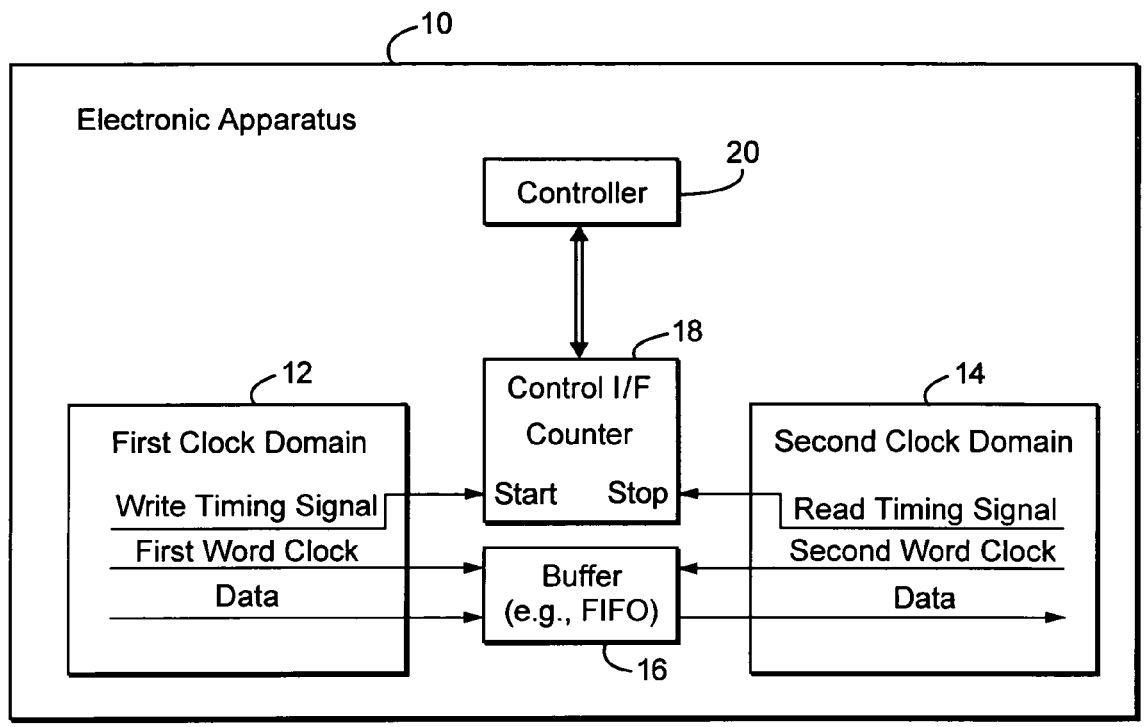
FIG. 1 is a function block diagram of an electronic apparatus that uses a buffer to bridge two clock domains and a counter to determine a delay associated with the buffer.

FIG. 1 is a function block diagram of an electronic apparatus 10 that uses a buffer 16, which may be for example a first-in-first-out (FIFO) buffer, to bridge two clock domains: first clock domain 12 and second clock domain 14. The first clock domain 12 is associated with a first word clock and with a timing signal labeled as a write timing signal. This means that the write timing signal corresponds to a rising edge of the first word clock. The second clock domain 14 is associated with a second word clock and a timing signal referred to as a read timing signal. This means that the read timing signal corresponds to a rising edge of the second word clock.

Although the first and second clock domains have approximately the same frequency, their respective clocks may have a variable phase and time relationship. The FIFO buffer 16 absorbs the variable phase and synchronizes data transferred between the two phase-independent clock domains. Using the first word clock and the second word clock, respectively, the data may be written into and read out from the buffer 16. To determine the buffer delay which corresponds to the first and second word clock phase delay, a counter 18 is used. The counter 18 includes a start count input or reset input and a stop count input. When the data is written from the first clock domain 12 into the buffer 16, the write timing is applied to the start input of the counter 18, which starts the counter counting. As soon as the data is read from the buffer 16 into the second clock domain 14, the read timing is applied to the stop input of the counter 18, which stops the counter 18. Any timing signal may be used to timing the start and/or stop counter inputs. Several non-limiting examples include a clock signal, a trigger signal generated when a certain pattern is detected (e.g., K28.5), a strobe signal etc.

The counter 18 is clocked at a frequency higher than the frequency of the first and second word clocks. Consequently, the counter 18 can measure the buffering delay with high resolution. The count value, which corresponds to the buffering delay, is provided to a controller 20 via a control interface to perform one or more control operations. For example, the controller may use the delay value as part of another measurement or to compensate for the buffering delay.

Figure 2:
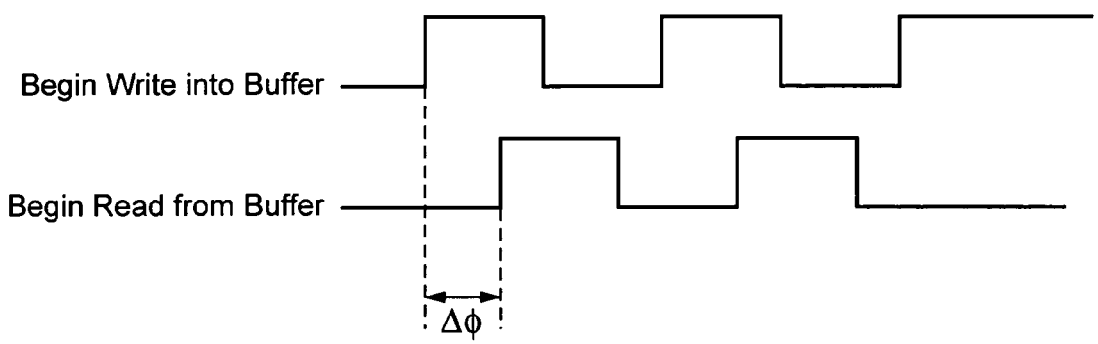
FIG. 2 is a timing diagram to illustrate a phase relationship/delay between writing data into the buffer and reading the data out of the buffer.

FIG. 2 is a timing diagram to illustrate a phase relationship/delay between writing data into the buffer 16 and reading the data out of the buffer 16. The phase delay is shown as $\Delta\phi$. Because the counter 18 is clocked at a frequency considerably higher than that of the write/read and timing signals, the phase delay $\Delta\phi$ may be determined accurately and with high resolution.

Figure 3:
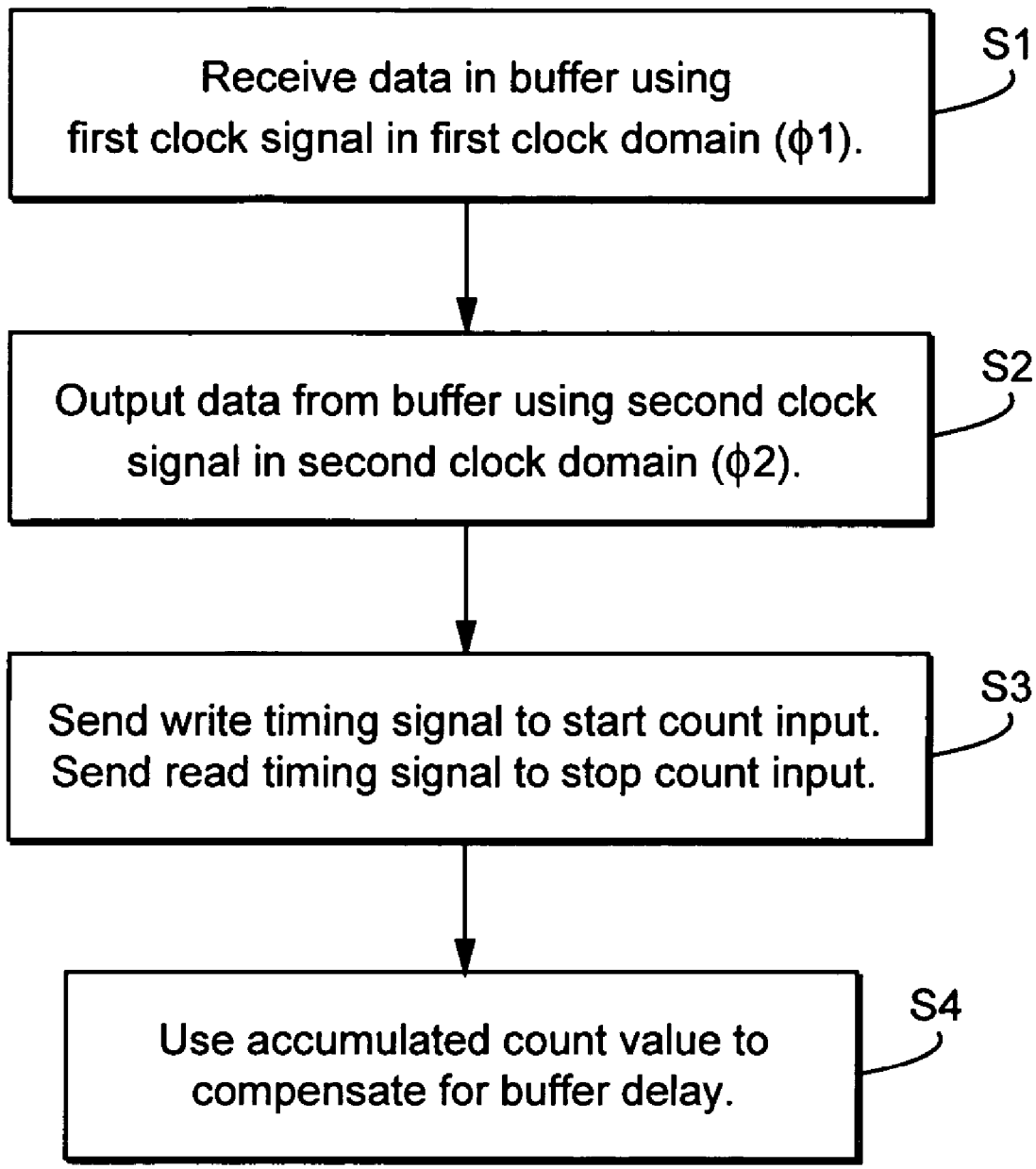
FIG. 3 is a flow chart diagram illustrating example procedures for determining a delay associated with the buffering in FIG. 1.

FIG. 3 is a flow chart diagram illustrating example procedures for determining and compensating for a delay associated with the buffering in FIG. 1. Data is received in the buffer 16 using a first clock signal (e.g., a first word clock) in a first clock domain ($\phi1$) (step S1). Data is output from the buffer 16 using a second clock signal (e.g., a second word clock) in a second clock domain ($\phi2$) (step S2). A write timing or timing signal based on the first clock signal is sent to start or reset the counter 18, and the read timing or timing signal based on the second clock signal is sent to stop the counter 18 (step S3). The accumulated count value is used to perform a control operation such as compensate in some fashion for the buffering delay (step S4).

Figure 4:
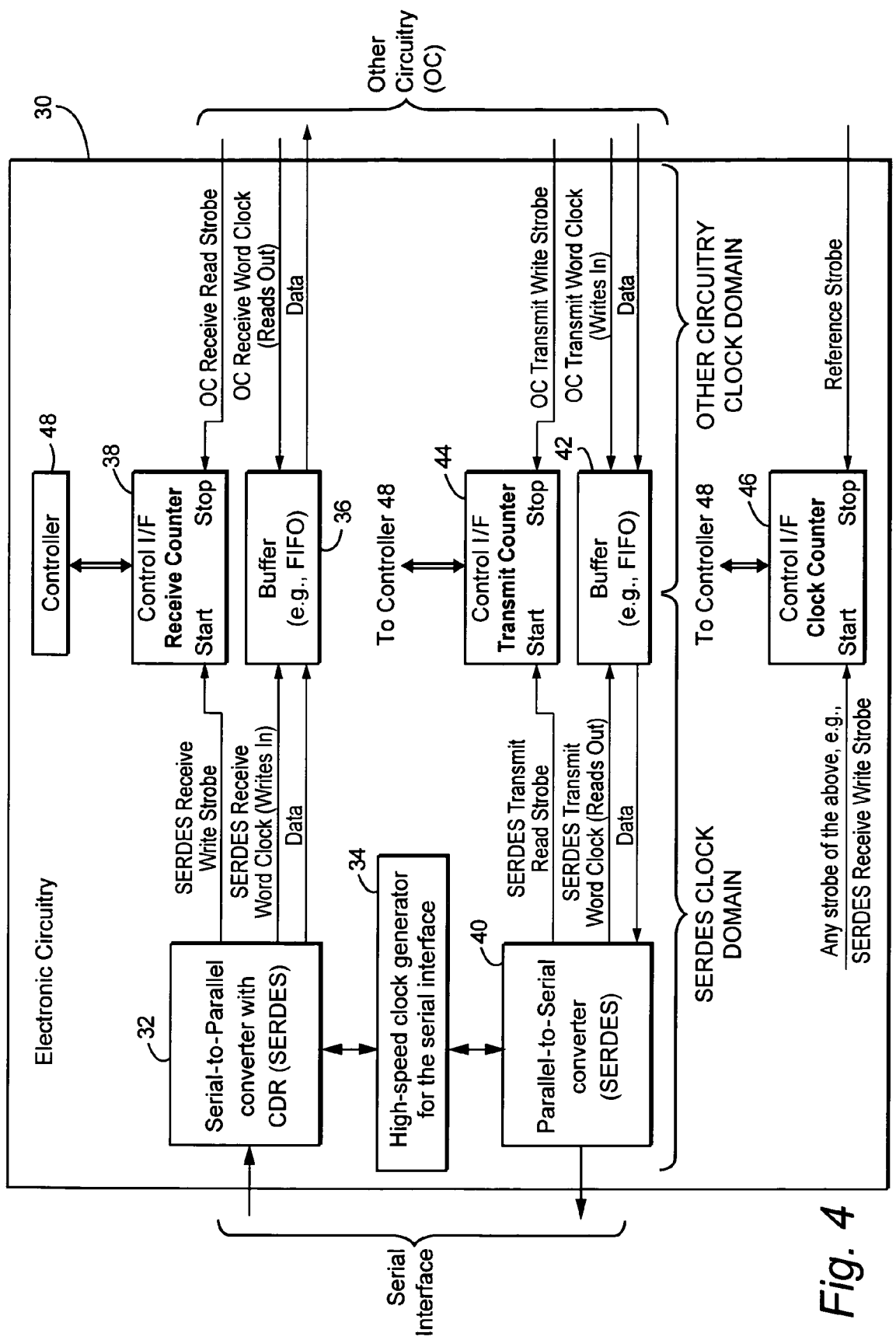
FIG. 4 is a function block diagram showing a non-limiting example application of the electronic apparatus shown in FIG. 1 where one of the electronic circuits is a SERDES interface.

FIG. 4 is a function block diagram showing a non-limiting example application to electronic circuitry 30 where serializer/deserializer (SERDES) circuitry provides a serial interface for other circuitry that operates in a parallel bit format. Along a receive branch of the electronic circuitry 30, serial data is received in a serial-to-parallel converter with clock data recovery (CDR) unit 32 and converted into parallel format. In this example, the serial-to-parallel converter 32 is operated using a high-speed serial interface clock provided from a high speed clock generator 34. The receive word clock signal corresponds to a clock signal extracted from the received serial data stream using conventional or other CDR techniques. The receive word clock corresponds to the receive word clock domain and is used to write a word of parallel data into a receive buffer 36, which could be a FIFO buffer. A SERDES receive write strobe or trigger signal associated with the receive word clock domain is input to a start or reset input of a receive counter 38 at the same time that the data word is written into the receive buffer 36. The write strobe is generated in the receive word clock domain, and thus, it is aligned to the positive edge of the clock signal in this clock domain.

The data word in the receive buffer 36 is read out in accordance with an other circuitry (OC) word clock associated with the OC clock domain. The OC could be, for example, an ASIC, but it is not limited to an ASIC. The receive word clock domain and the OC clock domain operate at substantially the same frequency but usually are not synchronized, i.e., they have a variable phase. That phase difference is unknown. And as described above, the receive buffer is used to bridge that phase delay so that the data word can be transferred to the OC clock domain. An OC strobe or trigger signal associated with the OC clock domain is input to a stop count input of the receive counter 38 at the same time the data word is read from the receive buffer 36. The read strobe is generated in the OC clock domain, thus it is aligned to the positive edge of the clock signal in this clock domain. The receive counter 38 is clocked at a substantially higher frequency corresponding to the high-speed serial interface clock from the high speed clock generator 34.

The count value accumulated from the start count when the SERDES receive write strobe is activated to the stop count when the OC receive read strobe is activated corresponds to the buffering delay. That delay is provided via a control interface to a controller 48, which performs a control operation based on the count value, such as compensating for the phase delay Along a transmit branch of the electronic circuitry 30, a word of parallel data from the other circuitry operating in the OC clock domain is written into the transmit buffer 42 using an OC transmit word clock associated with the OC clock domain. At the same time, an OC transmit write strobe or trigger signal is provided to the start or reset input of a transmit counter 44. The buffered word is read out from the transmit buffer 42 using a transmit word clock associated with the transmit word clock domain. At the same time, a SERDES transmit read strobe or trigger signal associated with the transmit word clock domain is provided to a stop input of the transmit counter 44. The transmit counter 44 is clocked at a substantially higher frequency corresponding to the high-speed serial interface clock from the high speed clock generator 34.

The count value accumulated from the start count when the SERDES transmit write strobe is activated to the stop count when the OC transmit read strobe is activated corresponds to the buffering delay. That delay is provided via a control interface to a controller 48, which performs a control operation based on the count value such as compensating for that phase delay. The parallel data from the transmit buffer 42 is converted into serial format in a parallel-to-serial converter 40 transmitted over the serial interface in accordance with the high speed clock.

If the electronic circuitry 30 includes further electronic circuitry that operates in a third clock domain different from the first and second clock domains, then the electronic circuit may also employ a clock counter 46 to measure the phase between the second and third clock domains. The clock counter 46 includes a start or reset input that receives any one of the strobe or trigger signals from the OC clock domain, e.g., a OC receive read write strobe. The clock counter 46 includes a stop input that receives a reference signal from the third clock domain, e.g., the clock domain of the OC local timer. The clock counter 46 may be clocked at the higher frequency used to clock the other counters, i.e., a clock signal corresponding to the high-speed serial interface clock from the high speed clock generator 34. The count value accumulated from the start count when the OC receive write strobe is activated to the stop count when the reference signal from the third clock domain is activated corresponds to the phase offset between the second and third clock domains. That phase offset count is provided via a control interface to the controller 48, which performs a control operation based on the count value such as compensating for that phase offset.

Another non-limiting example application is two distributed base stations. A distributed base station includes a radio equipment controller (REC) and one or more radio equipment (RE) units. Distributed base stations have become more prevalent as third generation cellular telecommunication systems develop. These third generation mobile communication systems are often referred to as universal mobile telecommunication systems (UMTS). Wideband code division multiple access (WCDMA) is the main third generation access technique used for communications over the radio/air interface. UMTS systems include logical network elements that each have a defined functionality. Network elements are grouped into the radio access network (RAN), sometimes as referred to as the UMTS Terrestrial RAN (UTRAN), that handles all radio-related functionality, and the core network (CN) which is responsible for switching and routing calls and data connections to external networks such as PSTN, ISDN, PLMN, and the Internet. The UTRAN covers a graphical area which is divided into cell areas, each cell area being served by a radio base station. A cell is a geographical area where radio coverage is provided by the radio equipment. The user equipment (UE) interfaces the user and the radio/air interface.

The following example application focuses on the radio base station, called a node B in UMTS, which converts the data flow between the RNC interface and the radio/air interface. The internal interface within the distributed radio base station which links the REC to one or more REs is referred to herein as the common public radio interface (CPRI). Even though a public interface is envisioned, the CPRI interface could be used as a private interface. The following description is based on UMTS and CPRI nomenclature, but is not limited just to UMTS and/or CPRI systems, but instead, may be employed in any distributed radio base station.

The radio equipment control (REC) node provides access to the Radio Network Controller via the Iub interface in a UMTS radio access network, whereas the radio equipment (RE) node serves as the air interface to the user equipment (in the UMTS network the air interface is called the Uu interface). The REC performs the radio functions of the digital baseband domain, whereas the RE performs the analog radio frequency (RF) functions. The functional split allows a generic CPRI interface based on In-phase and Quadrature (IQ) complex data to be defined. Continuing with the non-limiting UMTS example, the REC is concerned with the Iub transports, the radio base station control and management, and the digital baseband processing. The RE provides the analog and radio frequency functions such as filtering, modulation, frequency conversion, and amplification. In addition to the user plane data (IQ data), control and management (C&M) control signals as well as synchronization control signals are exchanged between the REC and the RE. All information streams or "planes", including both control and user data, are multiplexed onto a digital serial communication line using layer 1 and layer 2 protocols. The different information flows have access to the layer 2 via appropriate service access points (SAPs). The protocols for the physical layer (layer 1), and the data link layer (layer 2) are defined by the CPRI.

Figure 5:
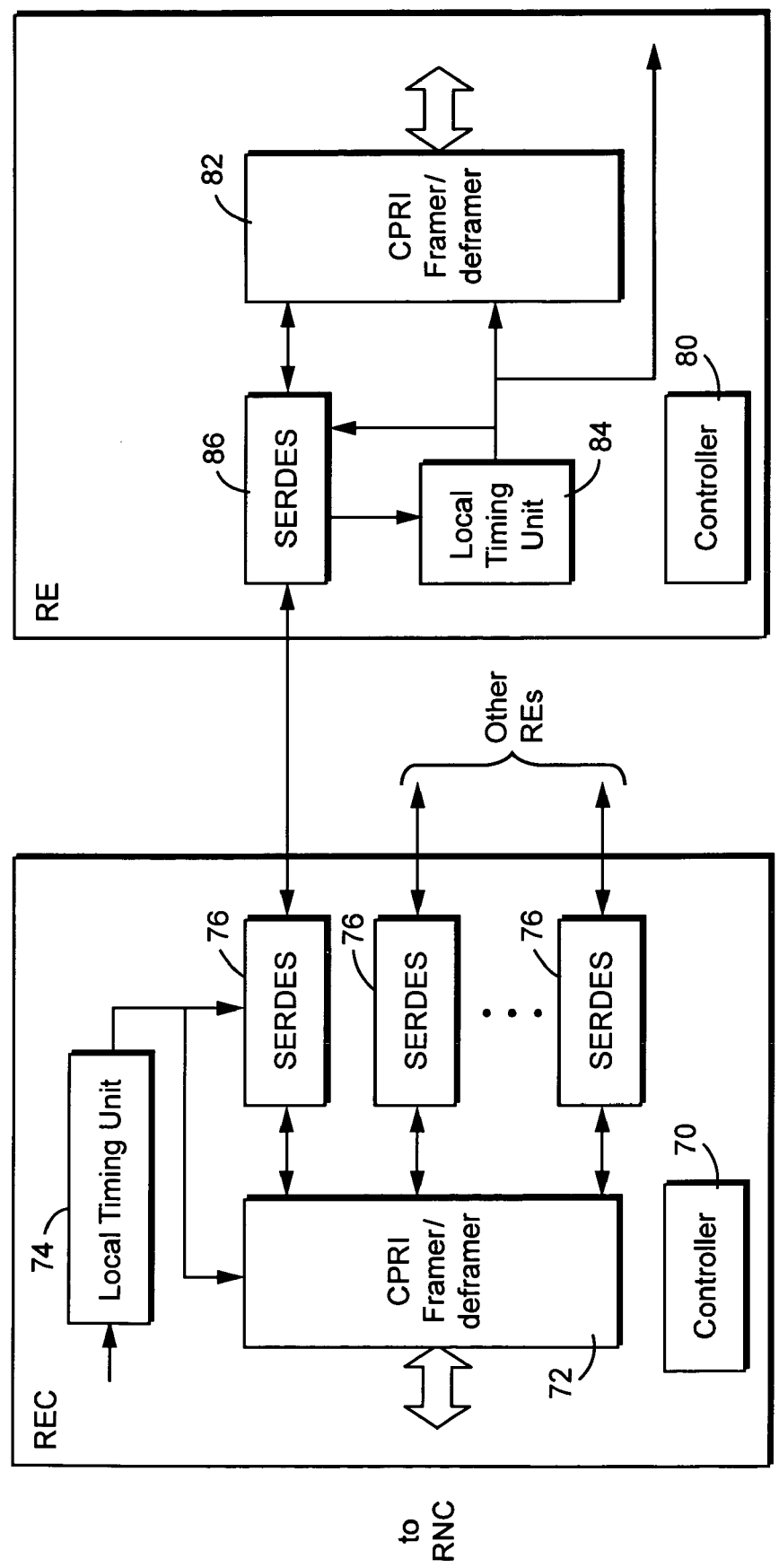
FIG. 5 is a function block diagram of a distributed radio base station.

FIG. 5 is a function block diagram of a distributed radio base station including an REC and RE. The REC node is managed by a controller 70, e.g., a CPU. A framer/deframer unit 72 is coupled to the controller 70. Each data flow corresponding to the data for one antenna of one carrier is provided to the framer 72 which multiplexes all data flows, control and management information, synchronization information and layer one (L1) information into a particular frame structure. The frame structure for a particular RE is then provided to a serializer/deserializer unit (SERDES) 76 corresponding to the RE, and the SERDES 76 generates a serial stream on an output port corresponding to that RE. Similarly, information from each RE is received on an input port, de-serialized by SERDES 76, (i.e., put into parallel form), and provided to the deframer 72. The deframer 72 extracts and distributes to the appropriate SAP, the data flow, controller management, and layer 1 timing and maintenance information. A local timing unit 74 provides frequency and time references for the REC. The local timing unit 74 output signal is used by the SERDES 74 as frequency reference for generating the serial clock transmitting the information downlink to the RE.

The RE has a similar structure and is managed by a controller 80, e.g., a CPU. The controller 80 is coupled to a CPRI framer/deframer 82. The framer/deframer 82 is coupled to one or more antenna elements, where each antenna element receives a corresponding data flow. The framer/deframer 82 extracts control and management data, layer 1 maintenance data, and timing data received from the REC by way of the serializer/deserializer 86 and provides it to the controller 80 over a control link not shown. The framer/deframer 82 also combines control management data, layer 1 data and data flow information in a frame structure and provides the frame structure to the REC in serial form via the serializer/deserializer 86. The data flow information is received from the analog radio part of the RE for multiplexing into the basic frame structure. The SERDES 86 extracts the serial clock of the downlink interface received from the REC and outputs it to the local timing unit 84 which stabilizes it, and outputs it as a frequency reference in the RE.

The REC regularly transmits a known "time mark," generated by the REC's local timing unit 74, over the CPRI links that can be readily detected and recognized by each RE. The time mark at the outgoing or incoming interface port is used to relate time to a unique carrier instant on the interface. In the example implementation, the time mark is a known 10-bit K28.5 symbol that is sent every ten milliseconds by the REC. When the time mark is received by the RE, the RE's local time unit 84 is set to a predetermined value, e.g., zero. In this way, the local time unit 84 is synchronized by "slaving" it to the timing mark generated by the REC's local timing unit 74.

The TDM structure requires that both the transmitting node REC/RE and the RE/REC receiving node correctly know when a hyperframe starts. As a result, the receiving node must be able to detect the first basic frame of a hyperframe, the first octet or byte of the first basic frame, and the first bit of the first byte. All three synchronization levels are achieved by sending a unique, known symbol as the first word in a hyperframe. One example is the K28.5 symbol which is an 8B/10B code having a total of 10 bits. Two of those bits are redundant bits used for error detection and/or correction. Of course, other known symbols could be used. Using the K28.5 symbol, the RE performs clock and data recovery (CDR). By initially transmitting the K28.5 symbol, the REC defines word borders in the hyperframe.

Figure 6:
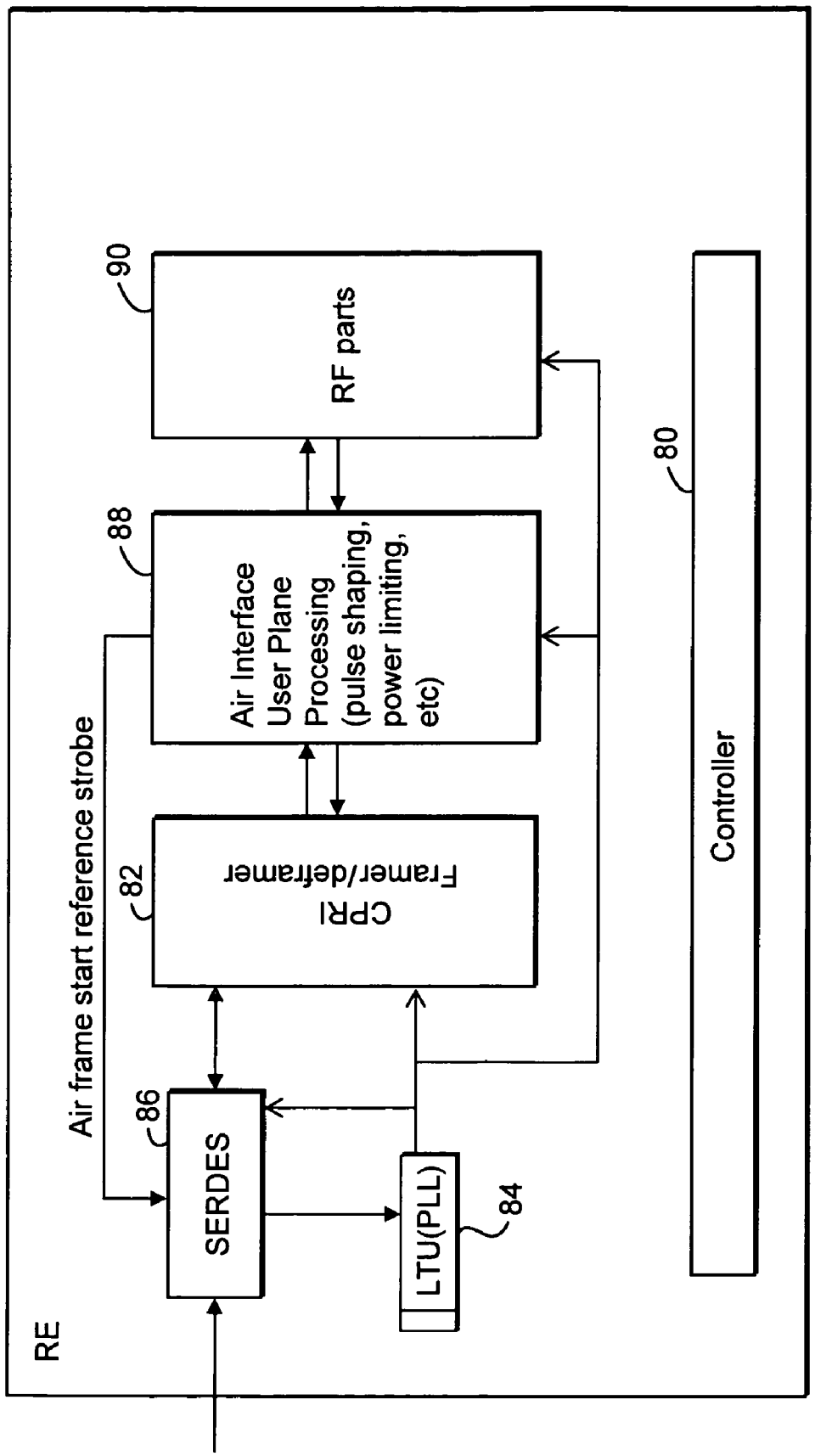
FIG. 6 is a function block diagram showing certain functional elements in an RE from FIG. 5.

As shown in FIG. 6, the RE includes three different clock domains: the SERDES 86 clock domain, the framer/deframer 82 clock domain, and the air interface processing circuitry 88 clock domain. Each clock domain change introduces an unknown delay. The domains could be on the same or different integrated circuits. For instance, the framer/deframer circuitry 82 and the air interface processing circuitry 88 could be on a digital ASIC with an internal clock multiplier, the same ASIC having the SERDES 86 as an incorporated block. The output of the ASIC could be samples to a digital to analog converter of the radio frequency (RF) circuitry 90, which in turn is clocked by the LTU clock. The air interface processing circuitry 88 may be an ASIC which processes the data, e.g., pulse shaping, power limiting, etc., before the data is transmit via the radio frequency (RF) circuitry 90. The air interface processing circuitry 88 provides an air frame start reference strobe to the SERDES 86 to allow the second and third clock domains to be synchronized using a clock counter.

Figure 7:
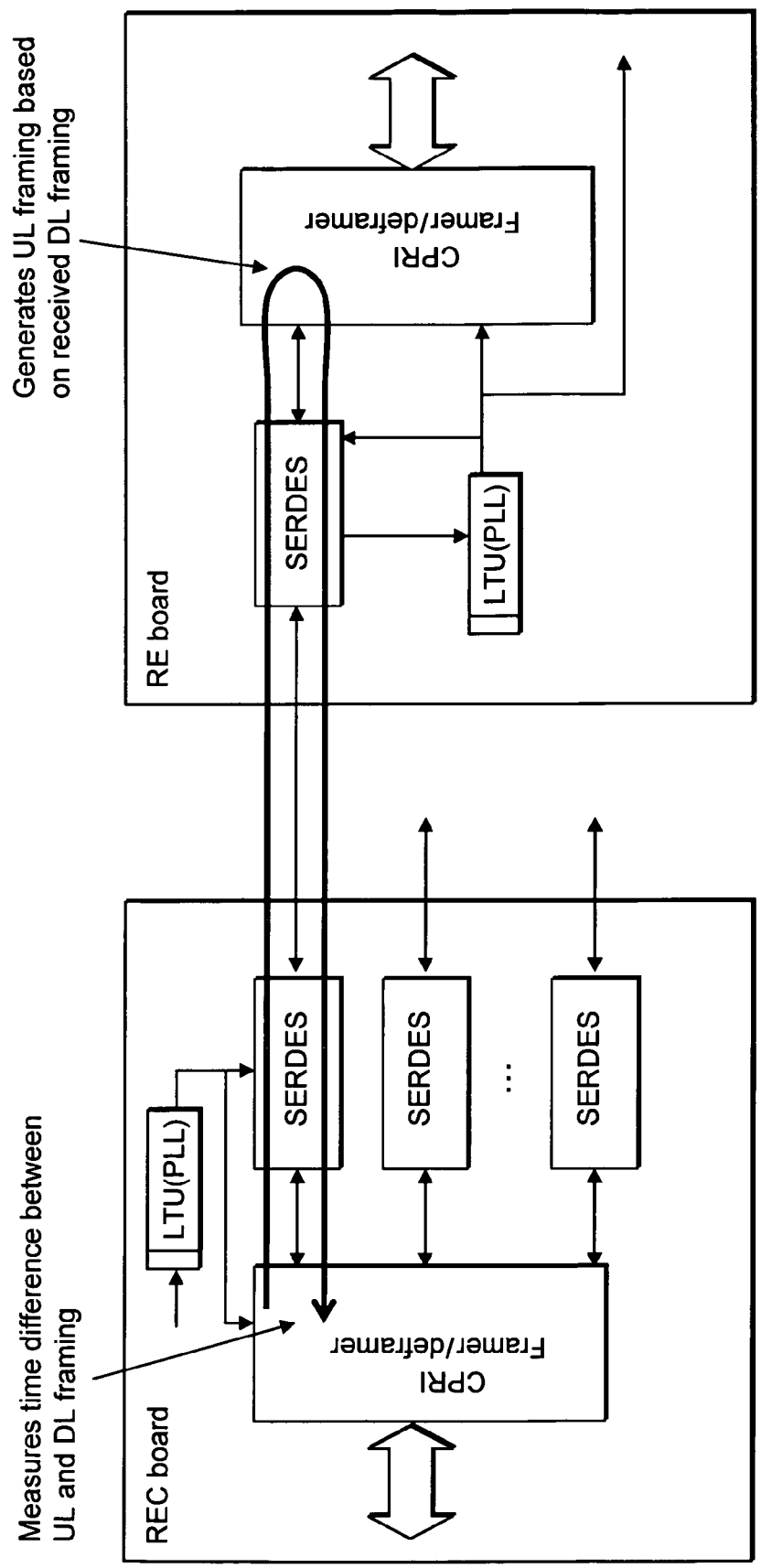
FIG. 7 is a function block diagram illustrating a loop back round trip delay measurement in the distributed radio base station of FIG. 5.

Related to synchronization is the issue of calibration/compensation for delays associated with the CPRI interface. The CPRI provides a mechanism to calibrate the round trip delay between the REC and RE. FIG. 7 shows a loop back of a known signal transmitted in the downlink by the REC to the RE and then returned in the uplink by the RE back to the REC. The RE framer/deframer generates uplink framing based received downlink frames. The REC measures a time difference between the uplink and downlink framing.

Figure 8:
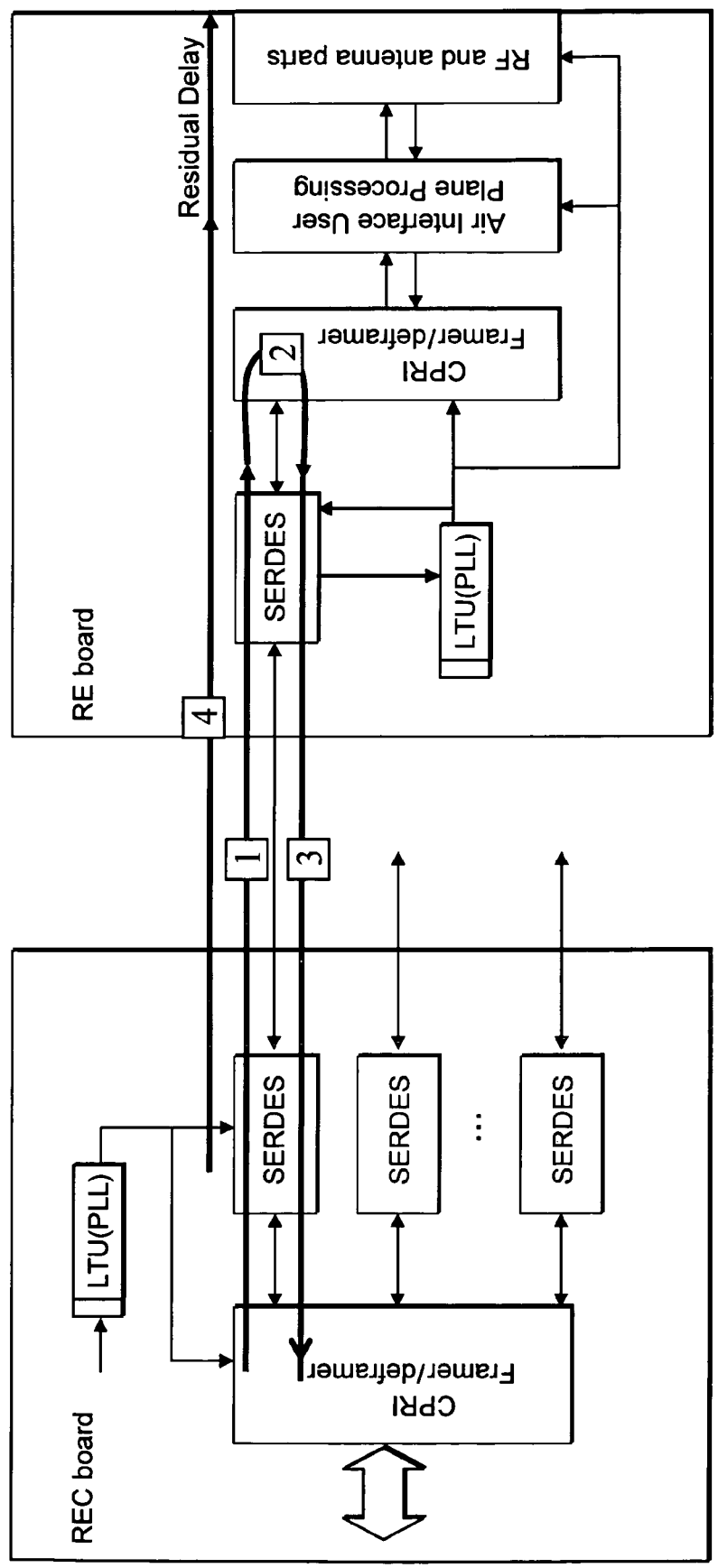
FIG. 8 is a function block diagram illustrating a loop back round trip delay measurement broken down into delay segments in the distributed radio base station of FIG. 5.

FIG. 8 illustrates one example application where the buffering delays may be used in synchronizing the REC with one or more REs. Three path delay components are shown 1, 2, and 3. Some of the delay components are known because they have been previously measured, e.g., calibration of analog parts at the factory. But other delay components are unknown and must be measured. The unknown downlink path delay 1 includes the transmit buffer delay in the REC SERDES, the serial cable connection delay between the REC and the RE, and the receive buffer delay in the RE SERDES. It is assumed that delay component 2 is previously known. Unknown path delay component 3 includes the receive buffer delay in the REC SERDES, the cable delay from the RE to the REC, and the transmit buffer delay in the RE SERDES.

Using the technology described above, the two SERDES are able to determine the transmit and receive buffering delays associated with changing clock domains. That leaves the unknown contributions of the downlink cable REC→RE and the uplink cable RE→REC. If the cables are assumed to be of equal length, the total measured delay (corresponding to 1+2+3) minus all the delays known so far equals two times the cable length. The cable length can be measured and its associated delay can be calculated to a nanosecond level.

By knowing the user data delay over the interface corresponding to delay component 1, the REC can advance the data to be transferred to that corresponding RE so that the data is received in the RE at the appropriate time. If different REs have different interface delays, the REC can advance the data to each RE by its corresponding individual delay and thus achieve synchronous transmission from multiple REs on a nanosecond level, if desired. The delay compensation can also be done on the RE side. For example, the REC sends data to all REs advanced an equal amount, and each RE delays the data individually based on the measured interface delay, thus making the total delay (cable+internal buffering) equal for all REs.

Usually, the REs contain a final point of digital control, e.g., at the last part of the air interface digital processing or at the digital to analog (D/A) converter. If the final point of digital control is not associated to the RE framer/deframer clock domain, the delay component 4 must also be determined, which is the delay from when the frame start indication is generated in the REC to when the user data to be output at the start of the frame passes the final digital control point. The delay from the final digital control point to the air interface is assumed to be known, e.g., by measurement in production.

One example embodiment is that the air interface processing circuitry 88 contains a counter generating a local frame start indication. When the local frame start indication occurs, the user data to be transmitted at the start of frame is output from a local user data buffer. The residual delay from the output of the user data buffer to the user data reaching the air interface is known in advance. Since the user data and the frame start indication are transferred over the same interface, the delay component 4 is then the delay from when the frame start indication is generated in the REC to when the frame start indication is received in the time domain of the air interface processing circuitry 88. If the RE frame start indication in ASIC 88 is generated at the same time instant as the REC frame start indication is generated in the REC, then the frame start indication carried over the interface should be received by ASIC 88 at exactly the delay component 4+the residual delay after the RE frame indication was generated in ASIC 88.

To have synchronization in time between the REC and the ASIC 88 in the RE, the ASIC 88 should control its counter generating the frame start indications so the counter equals the delay component 4+the residual delay upon reception of the frame indication carried on the interface, e.g., by loading the counter with the delay component 4+the residual delay value upon reception of the frame start indication. If the frame start indication is generated in the clock domain of the REC framer/deframer, then the delay component 4 is the sum of the transmit buffer delay in the REC SERDES, the cable delay REC→RE, and the clock counter value it the RE SERDES, where the clock counter stop signal input is connected to a stop trigger signal associated with the clock domain of the ASIC 88.

Typically, the frame start indicator is generated by the framer/deframer in REC and at the same time for all REs connected. If the frame start indication is generated in another clock domain than of the framer/deframer in the REC, then the clock counter of the REC SERDES is also added in a corresponding way. This could be the case if the framer/deframer is split over multiple circuits.

The described technology solves the problem with accurate distribution of a time reference from one circuit to another circuit having different clock domains, for instance due to use of a high-speed serial link as the signal interface. Systems with such interconnect are very common, e.g., NTP over Ethernet, CPRI, etc.

All these systems rely on accurate delay measurements of the interconnecting interface to be able to remove the delay in the control algorithms. A weak point in current delay compensation approaches is at clock domain borders, e.g., the transfer of a data word encoding the time reference from the clock domain of the transmitting circuit to the clock domain of the receiving circuit. The described technology utilizes the fact that the SERDES, which has a clock domain border, also has a very high speed serial clock. Although that high speed clock is normally not available externally to the SERDES, the high speed clock can be used to measure the delay caused by crossing the clock domain border, typically on a nanosecond level. This allows the time reference to be transferred with a similar accuracy.

Without the technology described above, the typical delay compensation accuracy is much less, e.g., by at least a factor of 10. The high accuracy achieved by the described technology allows for interconnect simplification, which would otherwise require extra dedicated time distribution cables to achieve the same accuracy. The described technology thus decreases the time distribution inaccuracy and removes dedicated time distribution interfaces.

The described technology also solves a problem with unknown buffer depth between clock domains. If the timing signal to start or stop the counter is sent on every read or write signal to the buffer, then the phase difference between the clock domains would be measured. But the buffer between clock domains may be multiple words long to compensate for "wander" between the clocks of the two clock domains the buffer is bridging. The buffer delay can therefore be much longer than the phase difference. By sending the timing signal to start or stop the counter upon writing or reading a specific synchronization symbol to the buffer, the buffer delay can also be accurately measured in this variable buffer depth situation.

The described technology also solves a problem with maintaining timing accuracy all the way to the air interface in a radio base station comprising a CPRI interface. The high speed serial clock of the SERDES is used also to measure the time difference between the frame start indication transferred over the interface from the REC and the "local perception" of the frame start in the RE. The described technology allows for the time reference in the REC and the RE to be located in other time domains than the CPRI framer/deframers. This allows either one of the REC and RE to optimize the design of its respective time reference without having to keep that time reference within the two clock domains of the SERDES.

The described technology also solves the problem of relating delay measurements to each other. If the interface delay changes, (e.g., due to temperature changes), both the round trip delay measurement and the time reference transfer delays must be measured again. The time reference transfer delay relates to measuring on a frame start indication symbol, which for CPRI is the K28.5 symbol. The described technology uses the reading/writing of this known symbol to trigger generation of the timing signal to the counters used for the round trip delay measurement. As a result, all delay measurements (uplink, downlink, and time transfer clock domain measurements) may be tied to when the frame start indication is transferred. Both the round trip delay and the transfer of the time reference from REC to RE can be commonly processed to minimize any uncertainties.

Although various embodiments have been shown and described in detail, the claims are not limited to any particular embodiment or example. For example, the invention can be practiced in a wide variety of implementations and embodiments, and is not limited to the CPRI example described above. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC § 112 unless the words "means for" are used.

What is claimed is:

1. Apparatus comprising:
    buffer circuitry for receiving data to be processed by the electronic circuitry, the buffer circuitry being configured to input the received data using a first clock signal associated with a first clock domain and to output the received data using a second clock signal associated with a second clock domain, wherein the buffering of the data is associated with a buffering delay;
    counting circuitry for receiving at a start count input a write timing signal associated with the first clock domain and with writing data to the buffer circuitry and for receiving at a stop count input a read timing signal associated with the second clock domain and with reading data from the buffer circuitry,
    wherein a count value accumulated between receiving the write timing signal and the read timing signal corresponds to the buffering delay; and
    control circuitry for performing a control operation based on the accumulated count value,
    wherein the accumulated count value corresponding to the buffering delay represents a phase difference between the first and second clock signals, and the control circuitry is configured to compensate for the phase difference.

2. The apparatus in claim 1, wherein the first clock domain is associated with first processing circuitry, the first clock signal is a transmit write clock associated with writing data into transmit buffer circuitry, the second clock domain is associated with second processing circuitry, and the second clock signal is a transmit read clock signal associated with reading data from the transmit buffer circuitry, and
    wherein the counting circuitry includes a transmit counter and the second processing circuitry includes a parallel-to-serial converter for receiving data output in parallel format from the transmit buffer circuitry in accordance with the transmit read clock signal, converting the parallel data into serial format in accordance with a transmit serial clock signal, and providing serial data to a transmit serial interface.

3. The apparatus in claim 2, wherein the first and electronic processing circuitry are part of different integrated circuits or are part of the same integrated circuit.

4. The apparatus in claim 2, wherein the transmit write clock signal and the transmit read clock signal have approximately the same frequency, which is lower than a frequency of the transmit serial clock signal, and
    wherein the transmit counter is clocked in accordance with the transmit serial clock signal.

5. The apparatus in claim 1, wherein the first clock domain is associated with first processing circuitry, the first clock signal is a receive write clock associated with writing data into receive buffer circuitry, the second clock domain is associated with second processing circuitry, and the second clock signal is a receive read clock signal associated with reading data from the receive buffer circuitry, and
    wherein the counting circuitry includes a receive counter and the first processing circuitry includes a serial-to-parallel converter for converting serial data from a serial interface into parallel format in accordance with a receive serial clock signal and writing parallel data to the receive buffer circuitry in accordance with the receive write clock signal.

6. The apparatus in claim 5, wherein the receive write clock signal and the receive read clock signal have approximately the same frequency which is lower than a frequency of the receive serial clock signal, and
    wherein the receive counter is clocked in accordance with the receive serial clock signal.

7. The electronic circuitry in claim 1, wherein the write timing signal relates to writing a known synchronization symbol to the buffer circuitry, and the read timing signal relates to reading the known synchronization symbol from the buffer circuitry.

8. The electronic circuitry in claim 7, wherein the first electronic circuitry is a serializer/deserializer (SERDES) and the known synchronization symbol is a K28.5 symbol, and
    wherein the K28.5 synchronization symbol occurs at a predetermined rate.

9. The apparatus in claim 1, wherein the counter circuitry includes a clock counter configured to receive at a start count input one of the timing signals and to receive at a stop count input a reference timing signal associated with a third clock domain, and
    wherein the control circuitry is configured to perform another control operation based on the accumulated clock count value.

10. The apparatus in claim 9, wherein the first clock domain is associated with first processing circuitry, the second clock domain is associated with second processing circuitry, the third clock domain is associated with third processing circuitry, and wherein the accumulated clock count value corresponds to a time offset between the one timing signal and the reference timing signal.

11. The apparatus in claim 10, wherein the reference timing signal corresponds to an edge of a frequency reference signal of the third processing circuitry, wherein the accumulated count value corresponds to a phase offset between the frequency reference signal and the one timing signal, and wherein the frequency reference signal and the one timing signal have approximately the same frequency.

12. The apparatus in claim 9, further comprising:
    second buffer circuitry being configured to buffer data between circuitry in the second clock domain and circuitry in the third clock domain, wherein the buffering of data in the second buffer circuitry is associated with a second buffering delay,
    wherein the clock counter is configured to be started using the one timing signal, stopped with a third timing signal associated with the third clock domain, and clocked at a frequency substantially greater than a frequency at which data is input to and output from the second buffer circuitry.

13. Electronic apparatus for use with a first circuit board operable to communicate with a second circuit board, comprising:
    processing circuitry for performing a first operation in accordance with a first timing signal generated based on a first reference clock source for the first circuit board and a second operation in accordance with a second timing signal generated by a second reference clock source for the second circuit board;
    a counter for receiving at a start count input the first timing signal and for receiving at a stop count input the second timing signal, wherein a count value accumulated between receiving the first timing signal and the second timing signal corresponds to a delay associated with communicating using the electronic apparatus,
    wherein the count value corresponding to the delay represents a phase difference between the first and second timing signals, and the count value is useable to compensate for the phase difference.

14. The electronic apparatus in claim 13, wherein a count value accumulated between receiving the first timing signal and the second timing signal corresponds to a buffering delay associated with communicating using the electronic apparatus, and wherein the processing circuitry is configured to calculate a delay associated with communicating using the electronic apparatus in order to synchronize the first and second clock sources based on the count value.

15. The electronic apparatus in claim 13, wherein the first electronic circuitry includes a first SERDES and the second electronic circuitry includes a second SERDES.

16. Apparatus for use in a first radio base station node which in use operates with a second radio base station node, comprising:
 a base station clock source for producing a first reference clock signal;
 a framer/deframer receiving the first reference clock signal, generating a second clock signal, and formatting information into frames in accordance with the second clock signal;
 a serializer/de-serializer (SERDES) receiving the first reference clock signal and generating a serial clock signal, the SERDES including:
 a transmit buffer for storing data from the framer in accordance with the second clock signal and for outputting the stored data in accordance with a transmit clock signal associated with the serial clock signal, wherein the buffering of the data in the transmit buffer is associated with a transmit buffering delay;
 a receive buffer for storing received data in accordance with a receive clock signal associated with the serial clock signal and for outputting the stored data in accordance with the second clock signal to the de-framer, wherein the buffering of the data in the receive buffer is associated with a receive buffering delay;
 a transmit counter for receiving at a start count input a transmit write timing signal associated with the second clock signal when the data is written into the transmit buffer and for receiving at a stop count input a receive read timing signal associated with the transmit clock signal when the data is read from the transmit buffer, wherein a transmit buffer count value accumulated between receiving the transmit write timing signal and the transmit read timing signal corresponds to the transmit buffer delay;
 a receive counter for receiving at a start count input a receive write timing signal associated with the serial clock signal and the receive clock signal when the data is written into the receive buffer and for receiving at a stop count input a receive read timing signal associated with the second clock signal when the data is read from the receive buffer, wherein a receive buffer count value accumulated between receiving the receive write timing signal and the receive read timing signal corresponds to the receive buffer delay;
 delay processing circuitry for determining a delay associated with an interface interconnecting the first and second radio base station node, where the interface delay is based on one or both of the transmit buffer delay and the receive buffer delay; and
 control circuitry performing a control operation based on one or both of the transmit buffer count value and the receive buffer count value.

17. The apparatus in claim 16, further comprising:
 a parallel-to-serial converter for receiving data output in parallel from the transmit buffer and converting the parallel data into serial format in accordance with the serial clock signal, wherein the transmit buffer counter is clocked based on the serial clock signal, and
 a serial-to-parallel converter for receiving serial data, converting the serial data into parallel format in accordance with the serial clock signal, and providing the parallel data to the receive buffer using a receive clock signal extracted from the serial data, wherein the receive buffer counter is clocked in accordance with the serial clock signal.

18. The apparatus in claim 16, wherein the timing signals are generated when the data is a known synchronization symbol.

19. The apparatus in claim 18, wherein the known synchronization symbol is a K28.5 symbol, and
 wherein the K28.5 synchronization symbol occurs at a predetermined rate.

20. The apparatus in claim 16, wherein the radio base station includes a radio equipment controller (REC) portion and a radio equipment (RE) portion supporting one or more antenna elements, and wherein the apparatus is included in one or both of the REC and the RE.

21. The apparatus claim 16, wherein the counter circuitry includes a clock counter configured to receive at a start count input one of the timing signals and to receive at a stop count input a reference timing signal associated with a third clock domain, and
 wherein the control circuitry is configured to perform another control operation based on the accumulated clock count value.

22. A method comprising:
 receiving data in buffering circuitry to be processed by electronic circuitry in accordance with a first clock signal associated with a first clock domain;
 outputting the buffered data in accordance with a second clock signal associated with a second clock domain, wherein the buffering of the data is associated with a buffering delay;
 receiving at a start count input of counting circuitry a write timing signal associated with the first clock domain and with writing data to the buffer circuitry;
 receiving at a stop count input of the counting circuitry a read timing signal associated with the second clock domain and with reading data from the buffer circuitry, wherein a count value accumulated between receiving the write timing signal and the read timing signal corresponds to the buffering delay;
 performing a control operation based on the accumulated count value,
 wherein the accumulated count value corresponding to the buffering delay represents a phase difference between the first and second clock signals, and
 compensating for the phase difference.

23. The method in claim 22, wherein the first clock domain is associated with first processing circuitry, the first clock signal is a transmit write clock associated with writing data into transmit buffer circuitry, the second clock domain is associated with second processing circuitry, and the second clock signal is a transmit read clock signal associated with reading data from the transmit buffer circuitry;
 converting data output in parallel format from the transmit buffer circuitry in accordance with the transmit read clock signal into serial format in accordance with a transmit serial clock signal; and
 providing serial data to a transmit serial interface.

24. The method in claim 23, wherein the transmit write clock signal and the transmit read clock signal have approximately the same frequency, which is lower than a frequency of the transmit serial clock signal, and the method further comprising:

clocking the transmit counter in accordance with the transmit serial clock signal.

25. The method in claim 23, wherein the first clock domain is associated with first processing circuitry, the first clock signal is a receive write clock associated with writing data into receive buffer circuitry, the second clock domain is associated with second processing circuitry, and the second clock signal is a receive read clock signal associated with reading data from the receive buffer circuitry, the method further comprising:

converting serial data from a serial interface into parallel format in accordance with a receive serial clock signal, and writing parallel data to receive buffer circuitry in accordance with the receive write clock signal.

26. The method in claim 25, wherein the receive write clock signal and the receive read clock signal have approximately the same frequency which is lower than a frequency of the receive serial clock signal, the method further comprising:

clocking the receive counter in accordance with the receive serial clock signal.

27. The method in claim 23, wherein the accumulated count value represents a phase difference between the first and second clock signals, and the control circuitry is configured to compensate for the phase difference.

28. The method in claim 23, wherein the write timing signal relates to writing a K28.5 synchronization symbol to the buffer circuitry, and the read timing signal relates to reading the K28.5 synchronization symbol from the buffer circuitry, and wherein the K28.5 synchronization symbol occurs at a predetermined rate.

29. The method in claim 23, further comprising:

receiving at a start count input of a clock counter one of the timing signals and at a stop count input a reference timing signal associated with a third clock domain, and performing another control operation based on the accumulated clock count value.

30. The method in claim 29, wherein the first clock domain is associated with first processing circuitry, the second clock domain is associated with second processing circuitry, the third clock domain is associated with third processing circuitry, and wherein the accumulated clock count value corresponds to a time offset between the one timing signal and the reference timing signal.

31. The method in claim 30, wherein the reference signal corresponds to an edge of a frequency reference signal of the third processing circuitry, wherein the accumulated count value corresponds to a phase offset between the frequency reference signal and the one timing signal, and wherein the frequency reference signal and the one timing signal have approximately the same frequency.

32. The method in claim 29, further comprising:

buffering data between circuitry in the second clock domain and circuitry in the third clock domain, wherein the buffering of data in the second buffer circuitry is associated with a second buffering delay, starting the clock counter using the one timing signal, and stopping the clock counter with a third timing signal associated with the third clock domain, wherein the clock counter is clocked at a frequency substantially greater than a frequency at which data is input to and output from the second buffer circuitry.

* * * * *